United States Patent [19]

Citta

[11] Patent Number: 5,285,276

[45] Date of Patent: Feb. 8, 1994

[54] BI-RATE HIGH DEFINITION TELEVISION SIGNAL TRANSMISSION SYSTEM

[75] Inventor: Richard W. Citta, Oak Park, Ill.

[73] Assignee: Zenith Electronics Corp., Glenview, Ill.

[21] Appl. No.: 67,408

[22] Filed: May 25, 1993

Related U.S. Application Data

[63] Continuation of Ser. No. 872,211, Apr. 22, 1992, abandoned, which is a continuation-in-part of Ser. No. 667,836, Mar. 12, 1991, abandoned.

[51] Int. Cl.$^5$ .................... H09N 7/12; H09N 7/04; H09N 7/00
[52] U.S. Cl. .................... 368/409; 348/384; 348/469
[58] Field of Search ............... 358/141, 12, 133, 135, 358/136, 105, 167, 262.1; 375/17

[56] References Cited

U.S. PATENT DOCUMENTS

| | | | |
|---|---|---|---|
| 3,601,544 | 8/1971 | Murphy | 375/17 |
| 4,562,468 | 12/1985 | Koga | 358/136 |
| 4,734,767 | 3/1988 | Kaneko et al. | 358/133 |
| 4,894,713 | 1/1990 | Delogne et al. | 358/133 |
| 4,922,341 | 5/1990 | Strobach | 358/136 |
| 4,937,844 | 6/1990 | Kao | 375/122 |
| 4,954,892 | 9/1990 | Asai et al. | 358/133 |
| 4,972,260 | 11/1990 | Fujikawa et al. | 358/136 |
| 5,001,561 | 3/1991 | Haskell et al. | 358/133 |
| 5,144,423 | 9/1992 | Knauer et al. | 358/133 |
| 5,164,963 | 11/1992 | Lawrence et al. | 375/39 |

FOREIGN PATENT DOCUMENTS 52-006406  1/1977  Japan .................... 358/136

OTHER PUBLICATIONS

IEE Proceedings, vol. 133, Part F, No. 4, Jul. 1986, M. Tomlinson et al, "Digital Pseudo-Analogue Satellite TV Transmission System," pp. 384–398.

Proceedings of the IEEE, vol. 58, No. 7, Jul. 1970, D. Kirk et al, "A Digital Video System for the CATV Industry," pp. 1026–1035.

IEEE Transactions on Communications, vol. COM-31, No. 3, Mar. 1983, D. G. Daut et al, "Two-Dimensional DPCM Image Transmission over Fading Channels," pp. 315–328.

IEEE Transactions on Consumer Electronics, vol. 34, No. 1, Feb. 1988, H. Gaggioni et al, "Digital Video Transmission and Coding for the Broadband ISDN," pp. 16–34.

Primary Examiner—Victor R. Kostak
Assistant Examiner—Safet Metjahic

[57] ABSTRACT

A frame of compressed video data is formatted for transmission into a plurality of data segments, a first group of which are encoded in the form of a plurality of four-level symbols and a second group of which are encoded in the form of a plurality of two-level symbols for providing improved noise performance. The partition between the first and second groups of data segments may be established on a fixed basis, a variable basis dependent upon the effective level of compression, or a combination of both. Preferably, the levels are selected such that the average levels of the transmitted M and N-level symbols are substantially equal to a non-zero value to assist lock-up of the receiver PLL and reduce transmission power.

45 Claims, 3 Drawing Sheets

BI-RATE HIGH DEFINITION TELEVISION SIGNAL TRANSMISSION SYSTEM

CROSS REFERENCE TO RELATED APPLICATION

This application is a continuation of Ser. No. 7/872,211, filed Apr. 22, 1992 which is a continuation in part of application Ser. No. 667,836 filed Mar. 12, 1991, both as abandoned.

BACKGROUND OF THE INVENTION

The present invention generally relates to a system for digitally transmitting a video signal and particularly concerns a system for adaptively improving the signal-to-noise performance of a digitally transmitted video signal.

A number of systems have recently been proposed for digitally transmitting a wideband HDTV signal over a standard 6 MHz television channel. Typically these systems initially compress a wideband video source signal and then transmit the compressed signal over a selected 6 MHz television channel at a fixed data rate. While various video compression techniques are known in the art, temporally oriented systems seem to be presently preferred. In such systems, the compressed video information may be transmitted in the form of motion vectors and difference signals, with the motion vector identifying a previous portion of the video signal that closely matches the current portion and the difference signal representing the difference between the previous and current portions. Transmission of the motion vector and difference signals may be effected, for example, by encoding the binary data representing the two signals as a series of N-level symbols, each symbol thereby representing N/2 bits of binary data. Each symbol in a four-level transmission system would therefore represent two bits of binary data.

Digital video transmission systems of the foregoing type provide for extremely accurate reproduction of the transmitted image under ideal conditions and can even tolerate a certain degree of interference without appreciable performance degradation. However, if the level of interference encountered exceeds a threshold representing the signal-to-noise performance of the system, the ability to reproduce the televised image may be entirely lost. This is in contrast to an analog transmission system in which performance is gradually degraded as a function of interference. In the HDTV digital transmission environment, one source of such interference is expected to be NTSC co-channel signals from nearby television service areas.

OBJECTS OF THE INVENTION

It is therefore a basic object of the present invention to provide an improved digital video signal transmission system.

It is a more specific object of the invention to provide a digital video signal transmission system capable of operating in a relatively noisy environment.

It is another object of the invention to provide a digital video signal transmission system which is operable at different levels of signal-to-noise performance.

It is yet a further object of the invention to provide a digital video signal transmission system in which first selected video information is transmitted at a first signal-to-noise ratio and other video information is transmitted at a second, smaller signal-to-noise ratio.

It is still another object of the invention to adaptively vary the amount of video information transmitted at the first and second signal-to-noise ratios.

It is yet another object of the invention to provide a digital video signal constant power transmission system capable of transmitting video information at different levels of signal-to-noise performance.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
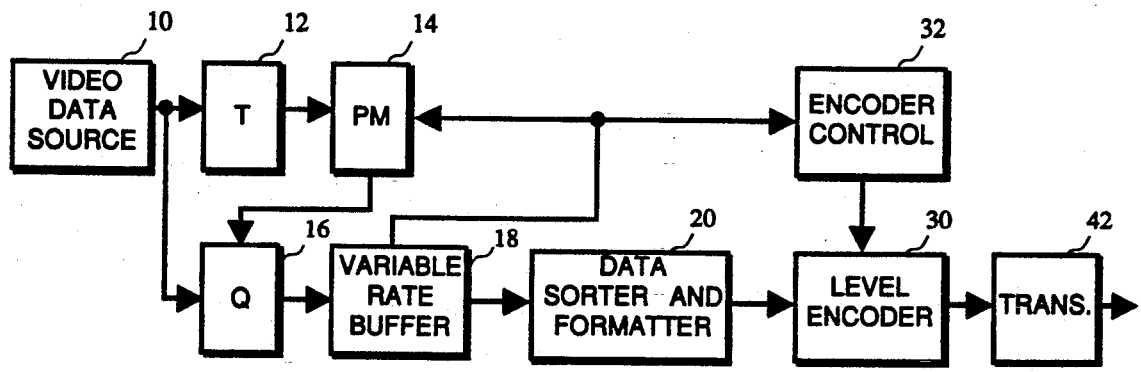
FIG. 1 is a block diagram of a video signal encoder and transmitter constructed in accordance with the invention.

FIG. 1 illustrates a video signal transmitter constructed in accordance with the invention. In its presently preferred embodiment, the transmitter incorporates a temporally-based video compression system and utilizes a suppressed carrier, vestigial sideband form of transmission. However, it is to be understood that the invention may be used with other types of video compression and transmission systems so that the details thereof should not be viewed as imposing any unnecessary limitations on the invention.

Referring therefore in more detail to FIG. 1, a video source 10 provides a wideband digital video signal which may have a bandwidth of up to about 37 MHz. Although not necessarily limited thereto, source 10 may provide, for example, a progressively scanned video signal in the form of successive frames of binary video data having a vertical periodicity equal to the NTSC standard (i.e. about 59.4 Hz) and a horizontal periodicity equal to three times the NTSC standard (i.e. about 47.25 KHz). The video data is applied in the form of a stream of binary pixel values from video source 10 to a transform coder 12 which may, for example, implement a discrete cosine transform. More specifically, transform coder 12 processes the binary pixel values for providing a series of blocks of spectral transform coefficients for each frame of the video source signal, each block of coefficients corresponding to a respective spatial region of the video image. In a presently preferred embodiment of the invention, each block comprises an (8×8) array of coefficients, with 14,400 blocks representing an entire video frame.

The coefficient blocks developed by transform coder 12 are applied one-at-a-time to a perceptual modeling system 14 which develops an output that reflects the perceptual nature of the corresponding portion of the video image. Perceptual modeling system 14, a preferred embodiment of which is more fully described in copending U.S. application Ser. No. 653,560, filed Feb. 8, 1991, for example, develops an output reflecting the degree to which the corresponding block of the video image is characterized by such perceptual characteristics as edge, texture, etc. A video compression system 16 is responsive to the output of perceptual model 14 for compressing the video signal developed at the output of source 10 in accordance with a selected compression algorithm. In a preferred embodiment of the invention, video compression is effected in the temporal domain wherein, for example, successive portions of the video image are analyzed to derive a respective motion vector and difference signal. The motion vector identifies a closely matching group of video pixels from the previous frame and the difference signal represents the difference therebetween. The difference signal is preferably variably quantized in response to the output of perceptual model 14 in the form of, for example, either a 0, 3, 5 or 7 average bit-length code and multiplexed with the motion vector to provide an output compressed binary video data signal.

Figure 2A:
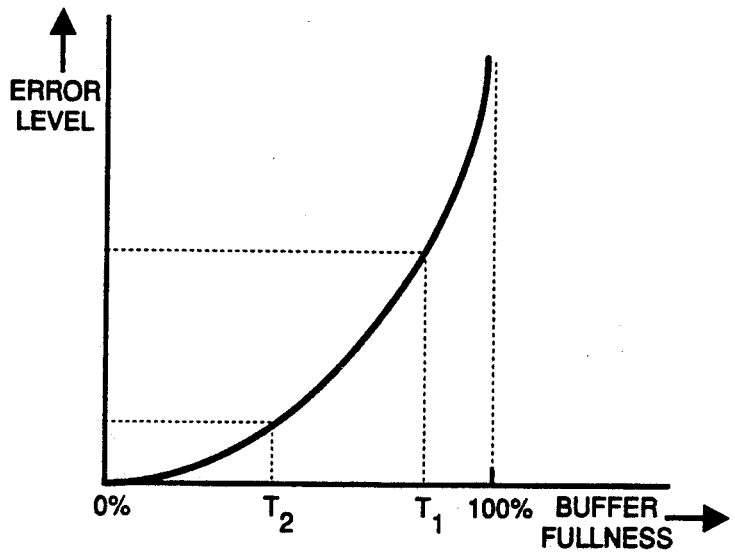
FIGS. 2A and 2B are respective graphs useful in explaining the operation of the encoder of FIG. 1.

The compressed signal developed at the output of compressor 16 is applied to the input of a variable rate buffer 18. Buffer 18 controls the flow of video data in the transmitter by providing a feedback signal to perceptual model 14 which reflects the fullness of the buffer. In particular, perceptual model 14 is responsive to the feedback signal for controlling compressor 16 in a manner so as to vary the degree of compression effected thereby as a function of the fullness of the buffer. Thus, as the fullness of buffer 18 increases, the extent of compression may likewise be increased and as fullness decreases the extent of compression may also be decreased to provide a relatively continuous flow of video data to the transmitter. The effect of the foregoing is illustrated in FIG. 2A which plots the degree of error introduced by compressor 16 as a function of buffer fullness. As shown in the graph, since the degree of compression varies directly as a function of buffer fullness, the error level likewise varies directly with buffer fullness. That is, increased compression provides an increased error level and decreased compression provides a decreased error level. In this regard, it has been determined that error levels produced when buffer fullness exceeds a first threshold T1 are excessive and that error levels produced when buffer fullness is less than a second threshold T2 are less than a normally expected range of errors. Error levels between buffer fullness thresholds T1 and T2 are within a normally expected range.

Figure 3A:
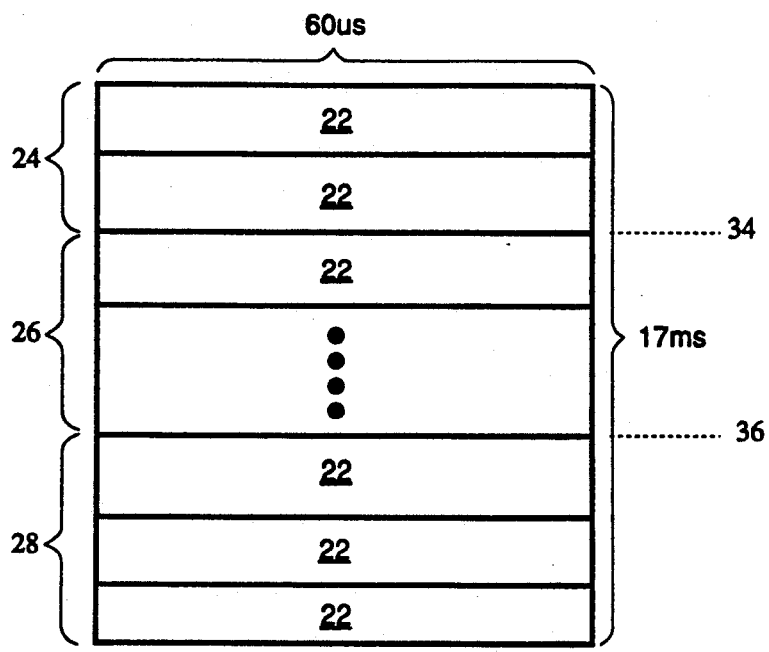
FIG. 3A illustrates a technique for formatting video data according to a preferred embodiment of the invention.

With further reference to FIG. 1, the compressed video data is coupled by buffer 18 to a data sorter and formatter unit 20. As described previously, the video data may comprise a combination of both motion vectors and variably quantized difference signals, although other classes of data may also be provided. Unit 20 sorts the various classes of data (e.g. motion vectors and difference signals) according to their relative importance and likewise ranks the data within each respective class. Thus, for example, the data applied to or developed in unit 20 may include various global control data necessary for proper operation of the receivers in the system. This class of data is therefore assigned the highest level of importance. The motion vectors, which are considered more important than the difference signals to the accurate reproduction of the televised image, are assigned the next highest level of importance and the difference signals the lowest relative level of importance. Unit 20 next formats the data into a transmission frame, an exemplary embodiment of which is illustrated in FIG. 3A, according to the foregoing classification as well as the inter-classification ranking of the data. The exemplary transmission frame shown in FIG. 3A is substantially coextensive with an NTSC field and comprises a plurality of data segments 22 each corresponding to an NTSC horizontal line.

In accordance with the invention, the most important class of data, i.e. the control data in the foregoing example, is grouped in one or more initial data segments 24, the next most important class, i.e. the motion vectors, in a succeeding group 26 of data segments 22 and finally the difference signals in a final group 28 of data segments 22. As mentioned above, the data within each group 24, 26, 28 of data segments 22 is likewise ranked according to its relative importance. Thus, for example, the more important motion vectors and difference signals are provided in the initial data segments of their respective groups, while the motion vectors and difference signals of lesser importance are provided in the lower data segments of the groups. Also, it will be understood that the number of motion vectors and difference signals may vary from frame to frame so that the number of data segments comprising groups 26 and 28 may likewise vary.

Figure 3B:
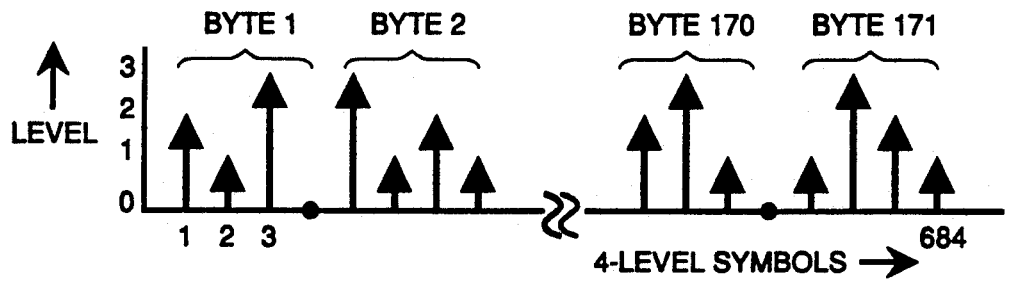
FIGS. 3B and 3C illustrate the manner in which different segments of the video data of FIG. 3A are encoded for transmission at different levels of signal-to-noise performance according to one embodiment of the invention.
Figure 3C:
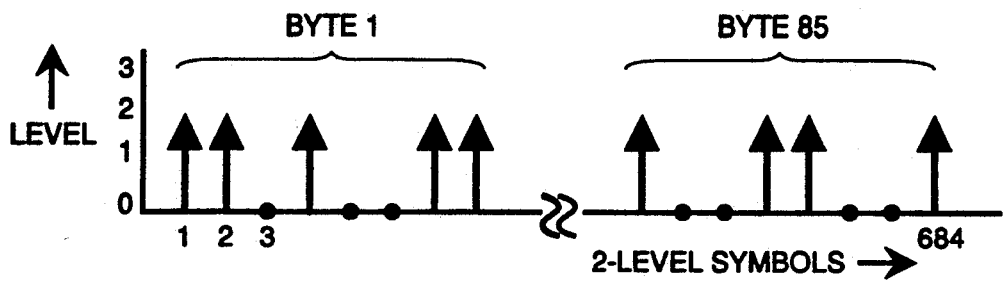

The formatted data frames developed by unit 20 are supplied to a level encoder 30 which is operated in response to an encoder control 32. Encoder control 32 is in turn responsive to the buffer fullness signal developed by buffer 18. Level encoder 30 is operable for encoding each segment 22 of the transmission frame in the form of about 684 four or two-level symbols, each four-level symbol representing two binary data bits and each two-level symbol representing one binary data bit. The output of level encoder 30 thus comprises a successive series of data segments 22 each characterized by a fixed symbol rate of approximately 10.5 megasymbols per second and a data rate of either 21 megabits per second (for four-level symbols) or 10.5 megabits per second (for two-level symbols). The foregoing is illustrated in FIGS. 3B and 3C which respectively represent a four-level data segment 22 and a two-level data segment 22. Referring to FIG. 3B, it will be seen that the data segment comprises 684 four-level symbols representing 171 bytes of data. Each of the data symbols, which are equally spaced by about 92 nanoseconds, assumes one of the four exemplary levels 0, 1, 2 or 3 for providing a fixed symbol rate of about 10.5 megasymbols per second and a corresponding data rate of about 21 megabits per second. The data segment of FIG. 3C also comprises 684 symbols but only represents about 85 bytes of data corresponding to a data rate of about 10.5 megabits per second. According to one important aspect of the invention, the levels characterizing the symbols of the data segment of FIG. 3C are selected from among the levels used to encode the symbols of the data segment of FIG. 3B. In particular, the symbols of the data segment of FIG. 3C are encoded using the levels 0 and 2 of FIG. 3B. These levels represent a compromise between maintaining a reasonably large difference between the levels while, at the same time, minimizing interference of the transmitted signal into a nearby cochannel.

It will be appreciated that the two-level symbols of the data segment of FIG. 3C, while providing half the data rate of the data segment of FIG. 3B, provide a noise improvement in relation thereto of about 9.5 db. According to the invention, this improvement in noise performance is advantageously utilized by encoding certain of the data in segments 22 as two-level symbols in accordance with FIG. 3C and other of the data as four-level symbols in accordance with FIG. 3B. The division of encoding levels may be set on a fixed basis, may be derived on an adaptively varying basis, or may comprise a combination of both techniques.

Figure 3D:
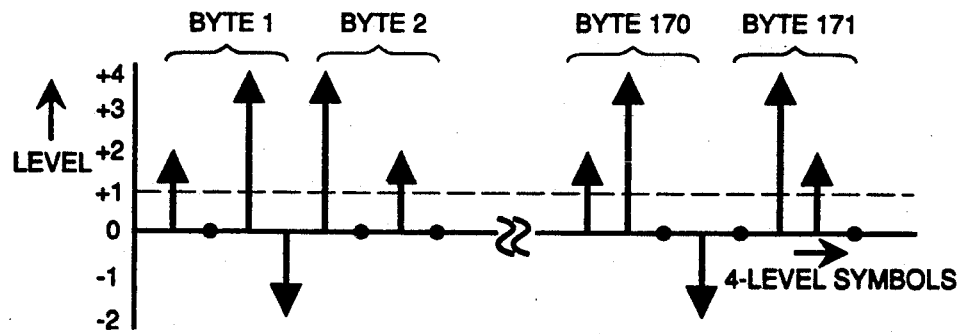
FIGS. 3D and 3E illustrate the manner in which different segments of the video data of FIG. 3A are encoded for transmission at different levels of signal-to-noise performance according to a preferred embodiment of the invention.
Figure 3E:
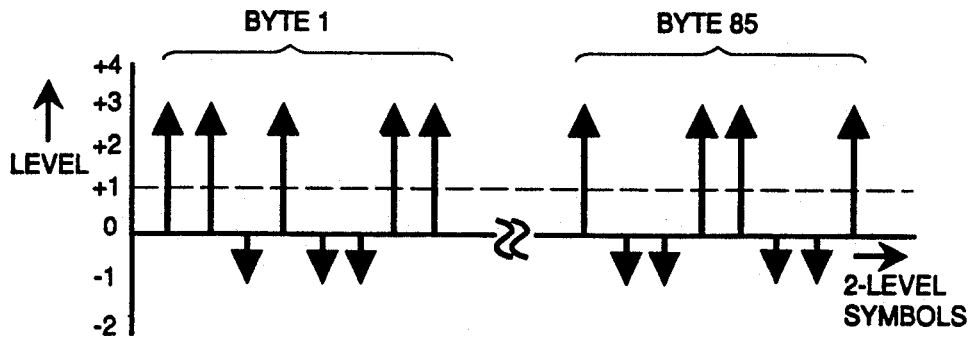

FIGS. 3D and 3E are similar to FIGS. 3B and 3C, respectively, but illustrate the four-level symbols and the two-level symbols arranged in accordance with the preferred embodiment of the invention. This embodiment is used in the recently proposed Digital Spectrum Compatible-HDTV system, jointly developed by Zenith Electronics Corporation and AT&T. In that system, the four-level symbols and two-level symbols are selected to result in equal average transmission power (assuming that the data is random and that all levels of symbols have the same probability of occurrence). The fixed average transmitted signal level (dashed lines at level "1" in FIGS. 3D and 3E) facilitates receiver lock-up and reduces overall transmitter power. The arrangement also reduces interference into co-channels and intersymbol interference.

As seen in FIGS. 3D and 3E, the four-level symbols have values of $-2$, 0, $+2$ and $+4$ and the two-level symbols have values of $-1$ and $+3$. The average value of each of these signals (assuming equal occurrence of all symbols) is $+1$. This is calculated as follows:

Four-level
$[(-2)+(0)+(+2)+(+4)]\div 4=(+4)\div 4=1$ and

Two-level $[(-1)+(+3)]\div 2=(+2)\div 2=1$.

The two-level symbols $-1$ and $+3$ are intermediate the four-level symbols 0 and $-2$, and $+2$ and $+4$, respectively. Of course, the receiver must be capable of distinguishing between six different symbol levels, versus the four different symbol levels in the FIGS. 3B and 3C version of the invention. It will be appreciated that the numbers associated with the various levels represent "normalized" values. It is the relative relationship between the different levels that is of concern and not their actual magnitude. It will also be appreciated that having the average levels of the two and four-symbol level transmissions equal a non-zero value yields a "pilot-like" output which makes lock-up of a receiver phase locked loop much easier. The selected levels above described produce a "1" value output for the receiver PLL in both the four-level and two-level symbol transmission modes.

In the DSC-HDTV system, the four-level symbols (FIG. 3B) are selected for modulo-4 processing (to permit use of NTSC signal rejection circuitry in the HDTV receiver) and mapped to different values. In particular, the (0) level is mapped to a ($-3$), the ($+1$) level to a ($-1$), the ($+2$) level to a ($+1$) and the ($+3$) level to ($+3$). The average of these symbols would be (0)—assuming equal probability of symbol occurrence. To provide a positive value "pilot" for aiding lock-up of the PLL in the receiver, an offset of ($+1$) is introduced. Thus the ($-3$) is offset to ($-2$), the ($-1$) to (0), the ($+1$) to ($+2$) and the ($+3$) to ($+4$). This set of symbol levels corresponds to FIG. 3D and results in a ($+1$) average pilot level. To maintain that average ($+1$) level for two-level symbol operation, the two level symbols ($-1$ and $+3$) are selected to be intermediate levels 0 and $-2$ and levels $+2$ and $+4$, as shown in FIG. 3E. It will be appreciated that the levels are mapped from those in FIGS. 3B and 3C directly to those in FIGS. 3D and 3E, respectively. The above described two-steps of mapping and offsetting helps explain the reason for the levels selected in the preferred embodiment.

Figure 2B:
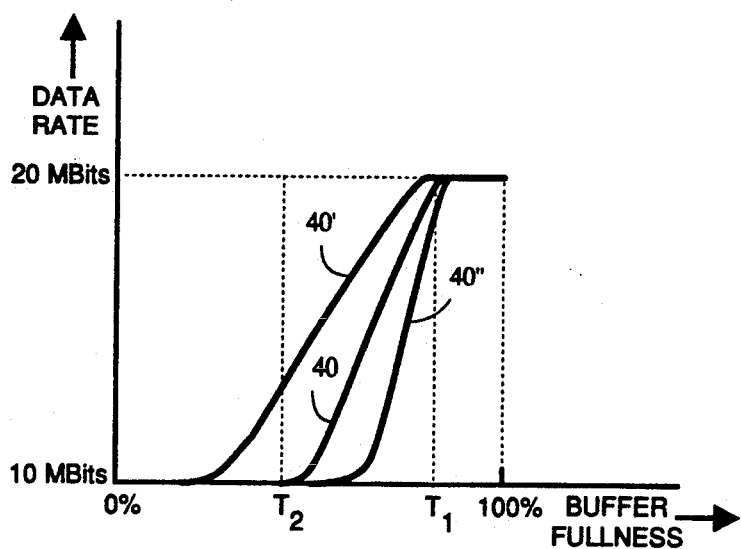

In a preferred embodiment of the invention, level encoder 30 is controlled by encoder control 32 to always encode certain data segments 22 of each transmission frame as two-level symbols, other segments 22 as two-level symbols on an adaptively varying basis, and the remaining segments 22 as four-level symbols. In particular, referring back to FIG. 3A, a pair of partitions 34 and 36 are established for defining the symbol levels to be used for encoding the various data segments. Partition 34 is a fixed partition, while partition 36 is variable between fixed partition 34 and the end of the frame. Data segments above fixed partition 34 are always encoded as two-level symbols, data segments between fixed partition 34 and variable partition 36 as two-level symbols and data segments below variable partition 36 as four-level symbols. In accordance with a preferred embodiment of the invention, fixed partition 34 is selected to define the global control data of data segment group 24 such that this class of data is always transmitted as robust two-level symbols. Variable partition 36 is controlled as a function of the fullness of buffer 18 as illustrated by the nominal curve 40 (FIG. 2B). That is, at levels of buffer fullness below fullness threshold T2, variable partition 36 is adjusted downwardly to the bottom of the frame and at levels of buffer fullness above fullness threshold T1 variable partition 36 is adjusted upwardly to fixed partition 34. For levels of buffer fullness between fullness thresholds T1 and T2, the variable partition is established by encoder control 32 between these two extremes such that the transmission frames are encoded at an average data rate reflected by the portion of curve 40 between thresholds T1 and T2.

In accordance with the foregoing, as much video data as can be accommodated by the system, in particular the most important portions thereof, is encoded in a robust manner as relatively noise-immune two-level symbols, the remaining data being encoded with reduced noise performance as four-level symbols. Moreover, increases in buffer fullness are compensated for by increasing the data rate which results from raising variable partition 36 in the transmission frame. Likewise, decreases in buffer fullness are advantageously utilized by lowering the variable partition and thereby reducing the data rate.

In order to facilitate decoding of the two and four-level symbols in a receiver, encoder control 32 inserts a count in the first segment of each transmission frame identifying the number of segments in each frame comprising two-level symbols. Since the count is above fixed partition 34 it will always be encoded as two-level symbols. This count, together with the remaining encoded symbols are coupled to a transmitter 42 for transmission over a 6 MHz television channel. Although not necessarily limited thereto, transmitter 30 preferably comprises the vestigial sideband, suppressed carrier transmitter described in copending application Ser. No. 611,236, filed Nov. 9, 1990.

Nominal curve 40 of FIG. 2B may be adjusted by the broadcaster in a tradeoff between the quality of the broadcast and the extent of geographical coverage provided thereby. For example, if the broadcaster desires to provide a higher quality broadcast, curve 40' of FIG. 2B may be employed to control level encoder 30 instead of curve 40. Curve 40' results in a tendency to raise variable partition 36 whereby an increased number of data segments are encoded as four-level symbols to increase the average transmitted data rate. While this improves the quality of the broadcast image, the extent of geographical coverage is reduced as a consequence of the reduction in the average signal-to-noise ratio of the transmitted signal. On the other hand, if the broadcaster desires to increase the geographical coverage of the broadcast, curve 40" of FIG. 2B may be employed to control level encoder 30. Curve 40" results in a tendency to lower variable partition 36 whereby an increased number of data segments are encoded as two-level symbols resulting in a decreased average transmitted data rate. This provides a more robust signal having increased geographical coverage but at a reduced quality level.

Figure 4:
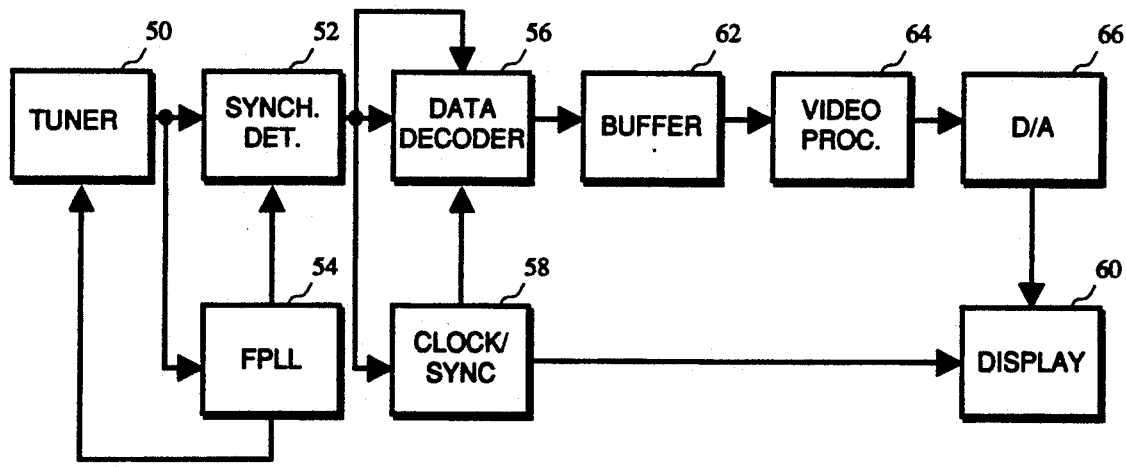
FIG. 4 is a block diagram of a video signal receiver constructed in accordance with the invention.

With reference now to FIG. 4, the transmitted signal is received by a receiver including a tuner 50. Tuner 50 converts the received signal to an intermediate frequency (IF) signal which is applied to a synchronous detector 52 and to a frequency and phase locked loop (FPLL) 54. FPLL 54 locks to the applied IF signal and generates a continuous wave output for application to synchronous detector 52. FPLL 54 may also generate an automatic frequency control voltage for controlling the operation of tuner 50. Synchronous detector 52, in response to the output of FPLL 54, demodulates the received signal and applies the demodulated signal to the inputs of a data decoder 56 and a clock and sync recovery circuit 58. The demodulated count signal, identifying the number of segments of each received frame encoded as two-level symbols, is coupled to a second input of data decoder 56. Circuit 58 applies a clock signal to a third input of data decoder 56 and appropriate sync signals for controlling a display 60.

Data decoder 56 is responsive to the count and clock signals for decoding the demodulated segments of two and four-level symbols coupled thereto. The decoded signal is applied through a buffer 62 as a fixed rate binary signal to a video processor 64 which decompresses the received signal to provide a wideband video output signal. It will be understood that since at least the most important portions of the received video signal were transmitted and received as relatively noise-immune, two-level symbols, highly accurate reproduction of corresponding portions of the image is achieved. Depending upon the level of noise encountered during transmission, the remaining four-level symbols may be reproduced with the same or with less accuracy. Finally, the decoded video data developed by processor 64 is applied through a D/A converter 66 to display 60 for reproducing the televised image.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

The matter set forth in the foregoing descriptions and accompanying drawings is offered by way of illustration only and not as a limitation. The actual scope of the invention is intended to be defined in the following claims when viewed in their proper perspective based on the prior art.

I claim:

1. A system for transmitting a video data signal comprising:
   means for variably compressing said video data signal;
   means for formatting said compressed signal into a plurality of data frames, each including a plurality of data segments;
   means for encoding a first group of the data segments of each of said frames in the form of a plurality of N-level symbols characterized by a constant symbol rate and for encoding the remaining data segments of each respective frame in the form of a plurality of M-level symbols characterized by said constant symbol rate, where M is greater than N, whereby each of said M-level symbols represents a greater number of data bits than each of said N-level symbols, said first group of data segments including a control signal identifying the data segments comprising said first group of data segments and the data segments comprising said remaining data segments; and
   means for transmitting said M and N-level symbols.

2. The system of claim 1 including buffer means coupled between and controlling the operation of both said compressing and encoding means as a function of the fullness thereof.

3. The system of claim 1 wherein said M and said N levels are selected such that the average levels of said transmitted M and N-level symbols are substantially equal.

4. The system of claim 3 wherein said average levels are a non-zero value.

5. The system of claim 1 wherein the levels of said N-level symbols are intermediate adjacent levels of said M-level symbols.

6. The system of claim 5 wherein M=4 and N=2.

7. The system of claim 6 wherein the normalized values of the levels of said M-level symbols are −2, 0, +2 and +4, and of said N-level symbols are −1 and +3.

8. The system of claim 1 wherein the levels of said N-level symbols comprise a subset of the levels of said M-level symbols.

9. The system of claim 2 including means for ordering the compressed video data according to its relative importance and control means responsive to the fullness of said buffer means for variably partitioning said ordered data into a first portion comprising the more important compressed video data which is encoded in the form of said N-level symbols and a second portion comprising the less important video data which is encoded in the form of said M-level symbols.

10. The system of claim 1 wherein said control signal comprises a signal identifying the number of data segments comprising said first group of data segments.

11. A television signal transmission system comprising:
   means for compressing said television signal;
   means for formatting said compressed signal into a plurality of data frames, each including a plurality of data segments;

means for encoding a first group of the data segments of each of said frames in the form of a plurality of N-level symbols characterized by a constant symbol rate and for encoding the remaining data segments of the respective frame in the form of a plurality of M-level symbols characterized by said constant symbol rate, where M is greater than N, whereby each of said M-level symbols represents a greater number of data bits than each of said N-level symbols, said first group of encoded data segments including a control signal identifying the data segments comprising said first group of data segments and the data segments comprising said remaining data segments, and where the average levels of said N-level symbols and said M-level symbols are substantially equal to the same non-zero value;

means for transmitting said encoded data segments over a selected channel; and means for receiving said transmitted data segments and reconstructing therefrom a fixed rate output signal representing said television signal.

12. The system of claim 11 wherein said first group of data segments represents a variable portion of each respective data frame which includes a fixed number of data segments in which said control signal is encoded as a plurality of said N-level symbols.

13. The system of claim 11 including buffer means coupled between and controlling the operation of both said compressing and encoding means as a function of the fullness thereof.

14. The system of claim 11 wherein said control signal comprises a signal identifying the number of data segments comprising said first group of data segments.

15. A television signal receiver comprising:

means for receiving a television signal comprising a plurality of data frames each including a plurality of data segments, each of said data frames comprising a first group of data segments comprising a plurality of N-level symbols characterized by a constant symbol rate and the remaining data segments of the respective frame comprising a plurality of M-level symbols characterized by said constant symbol rate, where M is greater than N, whereby each of said M-level symbols represents a greater number of data bits than each of said N-level symbols, said first group of data segments further including a plurality of N-level symbols representing a control signal identifying the data segments comprising said first group of data segments and the data segments comprising said remaining data segments; and means responsive to said received television signal for providing a fixed rate binary output signal representing received television information.

16. The receiver of claim 15 wherein said M and said N levels are selected such that the average levels of said received M and N-level symbols are substantially equal.

17. The receiver of claim 16 wherein said average levels are a non-zero value.

18. The receiver of claim 15 wherein the levels of said N-level symbols are intermediate adjacent levels of said M-level symbols.

19. The receiver of claim 18 wherein M=4 and N=2.

20. The receiver of claim 19 wherein the normalized values of the levels of said M-level symbols are −2, 0, +2 and +4, and of said N-level symbols are −1 and +3.

21. The receiver of claim 15 wherein the levels of said N-level symbols comprise a subset of the levels of said M-level symbols.

22. The receiver of claim 15 wherein said first group of data segments represents a variable portion of each respective data frame which includes a fixed number of data segments in which said control signal is encoded, said receiver including means responsive to said received control signal for decoding said receiving N-level and M-level symbols.

23. The receiver of claim 15 wherein said control signal comprises a signal identifying the number of data segments comprising said first group of data segments.

24. A television signal receiver comprising:

means for receiving a video signal comprising a plurality of data frames each including a plurality of data segments, each of said data frames comprising a first group of data segments including a plurality of N-level symbols characterized by a predetermined symbol rate and the remaining data segments of each respective data frame comprising a plurality of M-level symbols characterized by said predetermined symbol rate, where M is greater than N and where the average levels of said N and M-level symbols are substantially equal to the same non-zero value, whereby each of said M-level symbols represents a greater number of data bits than each of said N-level symbols, said first group of data segments further including a plurality of N-level symbols comprising a control signal identifying the data segments comprising said first group of data segments and the data segments comprising said remaining data segments; and means responsive to said control signal for decoding said first and second plurality of symbols for providing a fixed rate binary output signal representing a received video image.

25. The receiver of claim 24 wherein the levels of said N-level symbols are intermediate adjacent levels of said M-level symbols.

26. The receiver of claim 25 wherein M=4 and N=2.

27. The receiver of claim 26 wherein the normalized values of the levels of said M-level symbols are −2, 0, +2 and +4, and of said N-level symbols are −1 and +3.

28. The receiver of claim 24 wherein said first group of data segments represents a variable portion of each respective data frame in which said control signal is encoded.

29. The receiver of claim 24 wherein said control signal comprises a signal identifying the number of data segments comprising said first group of data segments.

30. A method of transmitting a television signal comprising:

formatting said television signal into a plurality of data frames, each including a plurality of data segments;

encoding a first group of said data segments of each of said frames in the form of a plurality of N-level symbols characterized by a constant symbol rate and encoding the remaining data segments of each respective data frame in the form of a plurality of M-level symbols characterized by said constant symbol rate, where M is greater than N, whereby each of said M-level symbols represents a greater number of data bits than each of said N-level symbols, said first group of data segments including a plurality of N-level symbols representing a control signal identifying the data segments comprising said first group of data segments and the data segments comprising said remaining data segments; and transmitting said data segments over a selected channel.

31. The method of claim 30, wherein said first group of data segments comprises a variable portion of the respective data frame.

32. The method of claim 31 wherein said first group of data segments comprises a fixed number of data segments including said control signal.

33. The method of claim 30 wherein said M and said N levels are selected such that the average levels of said transmitted M and N-level symbols are substantially equal.

34. The method of claim 33 wherein said average levels are a non-zero value.

35. The method of claim 30 wherein the levels of said N-level symbols are intermediate adjacent levels of said M-level symbols.

36. The method of claim 35 wherein $M=4$, $N=2$ and the normalized values of said M-level symbols are $-2$, $0$, $+2$ and $+4$ and of said N-level symbols are $-1$ and $+3$.

37. The method of claim 30 wherein the levels of said N-level symbols comprise a subset of the levels of said M-level symbols.

38. The method of claim 30 including both compressing said television signal and establishing the number of data segments comprising said first group as a function of a common criteria.

39. The method of claim 30 including receiving and decoding said transmitted N and M-level symbols for providing a fixed rate output signal.

40. The method of claim 30 including receiving said transmitted N and M-level symbols and decoding the received symbols in response to said control signal for providing a fixed rate binary output signal.

41. The method of claim 30 wherein said control signal comprises a signal identifying the number of data segments comprising said first group of data segments.

42. A system for transmitting a video signal comprising:

means for deriving a compressed video signal having components of higher and lesser importance for image reproduction;

means for encoding the components of said video signal of higher importance as a first series of data segments and for encoding the components of lesser importance as a second series of data segments, the encoded first series of data segments having a greater level of noise immunity and a lower bit-rate than the encoded second series of data segments, said first series of data segments including a fixed number of data segments comprising a control signal identifying the data segments comprising said first and second series of data segments; and means for transmitting said first and second series of data segments.

43. The system of claim 42 including means for receiving said transmitted first and second series of data segments and means responsive to said received control signal for decoding the components encoded in said data segments.

44. The system of claim 42 including a buffer for receiving said compressed video signal, said first and second series of data segments being established in response to the fullness of said buffer.

45. A television signal receiver comprising:

means for receiving a compressed video signal comprising a first plurality of encoded video components forming a first series of data segments and a second plurality of encoded video components forming a second series of data segments, said first series of data segments including a control signal identifying said first and second series of data segments, the encoded components of said first series of data segments having a greater level of noise immunity and a lower bit-rate than the encoded components of said second series of data segments; and means responsive to said received control signal for decoding said first and second pluralities of received video components.

* * * * *